US006494566B1

(12) United States Patent
Kishino et al.

(10) Patent No.: US 6,494,566 B1
(45) Date of Patent: Dec. 17, 2002

(54) HEAD MEMBER HAVING ULTRAFINE GROOVES AND A METHOD OF MANUFACTURE THEREOF

(75) Inventors: Toshikazu Kishino, Kagoshima (JP); Kazunori Soroi, Kagoshima (JP); Keisuke Ito, Kagoshima (JP); Makoto Ohkubo, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/015,468

(22) Filed: Jan. 29, 1998

(30) Foreign Application Priority Data

Jan. 31, 1997 (JP) ............................................ 9-019349
May 9, 1997 (JP) ............................................ 9-119546

(51) Int. Cl.[7] .......................... B41J 2/045; B23P 17/00; H04R 17/00

(52) U.S. Cl. ........................ 347/70; 29/25.35; 29/890.1

(58) Field of Search ............................ 347/68, 70, 71, 347/72; 29/25.35, 890.1

(56) References Cited

U.S. PATENT DOCUMENTS 4,766,671 A * 8/1988 Utsumi et al. ............ 347/71 X
5,359,760 A * 11/1994 Busse et al. ............... 29/25.35
5,856,837 A * 1/1999 Kitahara et al. .............. 347/70
5,912,526 A * 6/1999 Okawa et al. ............ 347/72 X
6,088,894 A * 7/2000 Oakley et al. ............. 29/25.35

* cited by examiner

*Primary Examiner*—Fred L. Braun
(74) *Attorney, Agent, or Firm*—Hogan & Hartson, LLP

(57) ABSTRACT

A printer head member having ultrafine grooves of high density and high precision. In one or more embodiments of the invention, a flat plate made of ceramics, glass, silicon or the like is bonded and integrated to a partition wall made of a powder of ceramics, glass, silicon or the like, obtained by a molding process. The mold used for obtaining the partition includes ultrafine grooves that conform to the shape of a partition. In another embodiment of the invention, a member for passage having high density and high precision is obtained by a molding process. A flat plate made of ceramics, glass, silicon or the like is bonded and integrated to a partition wall made of a powder of ceramics, glass, silicon or the like, using a molding die having one or more fine grooves for forming one or more partition walls, wherein at least a passage is formed between the partition walls. One or more embodiments of the invention are directed to an ink jet printer head including one or more ink chambers, an ejection port communicating with the ink chambers, and a diaphragm for applying pressure to the ink chambers. The diaphragm is formed of conductive inorganic material, and a piezoelectric element bonded to the diaphragm. A driving electrode is formed on the piezoelectric element. The displacement of a piezoelectric element is favorably transmitted to the diaphragm.

10 Claims, 6 Drawing Sheets

HEAD MEMBER HAVING ULTRAFINE GROOVES AND A METHOD OF MANUFACTURE THEREOF

BACKGROUND OF THE INVENTION

The present invention relates to a member having ultrafine grooves that can be used in a ip displacement control element, motor, relay, switch, shutter, printer head, pump, fan, ink jet printer, and an ink jet printer head using the same.

Recently, in the field of optics and precision processing, a displacement control element capable of adjusting the optical path length or position in the sub-micron order is demanded, and to meet such demand, various actuators are devised including, for example, those utilizing piezoelectric material and others utilizing static electricity.

More lately, in particular, for use in an ink jet printer head, a small-sized actuator is proposed, in which a ceramic green sheet is formed. Air vents forming ink chambers are formed by a die, and by laminating and baking a part thereof as a diaphragm. A piezoelectric drive section is formed on the surface of the actuator (see Japanese Laid-open Patent No. 4-12678).

The structure of an ink jet printer head is as shown in FIG. 7, in which a nozzle plate 23 forming a nozzle 6, a partition wall 22 forming ink chambers 1 or ink passages, and a diaphragm 21 are fabricated of ceramic green sheet. Thereby a head substrate 2 having ink chambers 1 and nozzles 6 and ink passages (not shown) is obtained. An electrode 4*a,* a piezoelectric element 3, and an electrode 4*b* are formed on the diaphragm 21 of the head substrate 2.

By applying a voltage between the electrodes 4*a* and 4*b,* the piezoelectric element 3 is deformed, and this displacement is transmitted to the ink chambers 1 through the diaphragm 21, so that the ink in the ink chambers 1 can be ejected from the nozzles 6. The ink jet printer head is required to have higher density and higher precision as the product is reduced in size. For example, the width of the partition wall 22 forming the head substrate 2 is demanded to be fabricated in the order of scores of microns.

In the manufacturing process of the ink jet printer head shown in FIG. 7, partition wall 22 is fabricated to form a head substrate 2 by blanking a ceramic green sheet by a die, where the ink chambers 1 and ink passages 6 are formed. Using this process, it is extremely difficult to manufacture the printer head in a such small size yet with high density and high precision. For example, when blanking the green sheet by the die, the sheet may be torn, or the respective position of the different elements with respect to one another may deviate when the diaphragm 21 or the nozzle plate 23 is laminated, thereby making it difficult to manufacture at high density and high precision. Further, it is also difficult and costly to manufacture the die used in such blanking in a small size and at high precision.

The invention, in one or more embodiments, relates to a member for passage having tiny passages of liquid for use in an ink jet head or small-sized pump, and its manufacturing method, and more particularly to an ink jet printer head using the same.

Today, along with the advancement of the multimedia, the demand for personal computers is increasing steadily; and the printer, which is one of the recording media of a personal computer, is required to have higher density and high definition in its performance. In particular, the ink jet system, introduced to replace the existing dot system, has been improved to print more quietly at higher definition and higher density and is now in high demand.

The ink jet system is proposed in various methods, such as the method of discharging ink drops from a nozzle by making use of a piezoelectric material, and the method of generating bubbles in ink by heat and discharging ink drops. In these methods, commonly, the ink is fed into a printer head, the ink is supplied through a passage, and the ink is discharged from an ink discharge port.

Such an ink jet printer head by thermal method is shown in FIG. 8, in which a flat plate 111 has plural partition walls 112, and a substrate 120 is bonded to a member 110 for forming a passage 113 between partition walls 112, thereby covering each passage 113. One end of each passage 113 is a discharge port 114, and the other end communicates with an ink chamber 116 having an ink feed hole 115. Moreover, at a position corresponding to each passage 113 of the substrate 120, a heating element 121 and an electrode 122 for energizing it are disposed.

Moreover, as shown in FIG. 9, when the passage 113 is filled with the ink 130 and the heating element 121 is energized to generate heat, bubbles 132 are generated in the ink 130; and by the force of the expansion of volume of these bubbles 132, ink drops 131 are discharged from the discharge port 113.

Incidentally, higher definition and higher density are demanded in ink jet printers recently. As such, in passage members 110 for composing the ink jet printer head 101, the width of the partition wall 112 and passage 113 are demanded to be as narrow as scores of microns.

To manufacture the passage member 110 having such ultrafine passages 113, various methods have been proposed, including a method of forming a masking in the portion of the partition wall 112 on the flat plate 111, processing grooves as passages 113 by sand blasting, a method of forming partition walls 112 by repeating screen printing on the flat plate 111, a method of applying a photosensitive resin in the portion of the partition walls 112 on the flat plate 111, and forming grooves as passages 113 by photolithography.

However, in the sand-blasting method, since the passages 113 are formed while digging grooves by blowing powder, it is necessary to keep constant the powder blowing force and angle, and it is difficult to process the inner surface of the passages 113 in a specified shape at high precision. In the screen-printing method, it is necessary to print many times, and as a result the partition walls 112 are deformed. In the photolithography method, a slight difference caused by the degree of right angle and depth of the partition walls, due to light illumination angle, time or other condition, can make it difficult to form the passages 113 at high precision. Additionally, in the passage members 110 manufactured using the above-mentioned methods, the inner surface of the passages 113 is not smooth. As a result, the ink flow was disturbed in the passages 113, and fluctuations were likely to occur in the ink discharge volume, discharge pressure, and response. Thus, a method is needed to allow for the formation of the passages 113 at high precision with smooth inner surfaces.

In one or more embodiments, the invention relates to an ink jet printer head used in an ink jet printer. The ink jet printer is a printer for printing by ejecting ink from the head, and it is widely used recently, owing to low noise and high printing speed. The structure of the ink jet printer head is as shown in FIG. 12, in which a head substrate 202 comprises a plurality of ink chambers 201 and ejection ports 206, and piezoelectric elements, where the piezoelectric elements 203 are bonded to positions corresponding to the ink chambers 201. The head substrate 202 includes a plate 223 forming ejection ports 206, a plate 222 forming ink chambers 201, a diaphragm 221, and a piezoelectric element 203 bonded on the diaphragm 221 through a lower electrode 205, whereby a driving electrode 204 is formed thereon.

By deforming the piezoelectric element 203 by applying a voltage between the lower electrode 205 and driving electrode 204, the diaphragm 221 is deflected, and the pressure in the ink chambers 201 is elevated so that the ink may be ejected from the ejection ports 206.

The conventional head substrate 202 and others were made of metal materials, but recently it has been proposed to use ceramics (see Japanese Laid-open Patent No. 6-40030 and Japanese Laid-open Patent No. 6-218929). For example, the head substrate 202 can be formed of ceramics mainly composed of any one of aluminum oxide, magnesium oxide and zirconia oxide. The lower electrode 205, piezoelectric element 203 such as PZT, and driving electrode 204 are formed on the diaphragm 221 to compose the ink jet printer head, so that the reliability may be kept high for a long period of use.

The ceramics-made ink jet printer heads are manufactured by lamination and thermocompression of multiple layers together. For example, green sheets are mainly composed of at least one of aluminum oxide, magnesium oxide and zirconium oxide; plates 222, 223 are fabricated by blanking with a die in the positions corresponding to the ink chambers 201 and ink passages. They are laminated with one green sheet as diaphragm 221 and bonded by thermocompression. The head substrate 202 is fabricated by baking at a temperature of about 1400° C., corresponding to the baking temperature of ceramics. Afterwards, on the diaphragm 221 corresponding to each ink chamber 201, metal paste is applied by screen printing as lower electrode 205, and then, for example, a PZT material is formed as piezoelectric element 203 by a thick film forming method, baked at about 1200° C., and a driving electrode 204 is formed thereon, thereby producing an ink jet printer head as shown in FIG. 12.

In such ceramics-made ink jet printer head, however, after fabricating the head substrate 202 by integrally baking the plates 222, 223 and diaphragm 221, it is necessary to form and bake the lower electrode 205, piezoelectric element 203 and driving electrode 204 individually on the head substrate 202. This manufacturing process is complicated and expensive, and requires a total of three or more baking steps. Moreover, to adjust to the position of the ink chambers 201, it requires a total of three steps of positioning for the lower electrode 205, piezoelectric element 203 and driving electrode 204. Positioning is difficult, and when these positions are set inaccurately, the expected performance may be greatly diminished.

Furthermore, the disposition of the lower electrode 205, between the piezoelectric element 203 and diaphragm 221, prevents the pressure caused by deformation of the piezoelectric element 203 to be fully transferred to the diaphragm 221, and can therefore lead to a lower driving efficiency. In contrast, in a metal-made ink jet printer head, not only the corrosion resistance is inferior, but also the response of the diaphragm to the piezoelectric element is poor because a bonding material must be placed between the diaphragm and piezoelectric element in order to bond them. It is hence an object of the invention to present an ink jet printer head that can be manufactured easily and is excellent in driving characteristics.

SUMMARY

One or more embodiments of the invention are directed to an ink jet printer head displacement control element having ultrafine grooves and a method of manufacturing thereof. The invention is characterized by bonding a partition wall obtained by forming a powder of ceramics, glass, silicon or the like by a molding die with a recess on one side of a flat plate of ceramics, glass, silicon or the like, then integrating and composing a member having ultrafine grooves.

The invention is also characterized by applying a mixture of powders of ceramics, glass, silicon or the like and a binder composed of solvent and organic additive to fill in a molding die having a recess for a partition wall, bonding this mixture to a flat plate of ceramics, glass, silicon or the like, then integrating and manufacturing a member having ultrafine grooves.

The invention is further characterized by forming the flat plate as a diaphragm, comprising a piezoelectric element for driving this diaphragm, an electrode for applying a voltage to the piezoelectric element, and bonding a nozzle plate to form the ultrafine grooves as an ink chamber, thereby composing an ink jet printer head. In one or more embodiments of the invention, a mixture for a partition wall material is applied into a prepared molding die having a recess for a partition wall, and this mixture is bonded and integrated to one side of a flat plate so that the shape of the molding die is directly transferred onto the flat plate. Therefore, when the molding die is preliminarily fabricated at high density and high precision, the partition wall can be easily formed at high density and high precision.

The procedure of bonding and integrating the partition wall and flat plate comprises steps of filling the molding die having the recess with mixture, solidifying tightly on the flat plate, and parting and baking. Alternatively, the procedure of bonding and integrating the partition wall and flat plate comprises the steps of filling the molding die with the mixture, solidifying, parting, contacting with the flat plate, and baking, or the steps of filling the molding die with the mixture, solidifying, parting, baking, and contacting or thermally bonding to the flat plate. Besides, the general glass and ceramics bonding method may be employed.

Another embodiment of the invention is directed to an ink jet printer head passage member and a method of manufacturing thereof. The invention is characterized by bonding a plurality of partition walls obtained by forming powder of ceramics, glass, silicon or the like by a molding die with a recess on one side of a flat plate of ceramics, glass, silicon or the like, integrating by arraying in one direction, and composing passage members having passages between partition walls.

The invention is also characterized by applying a mixture of powders of ceramics, glass, silicon or the like and a binder composed of solvent and organic additive to fill in a molding die having plural recesses for partition walls, bonding this mixture to one side of a flat plate of ceramics, glass, silicon or the like, integrating by arraying in one direction, and thereby manufacturing passage members.

The invention is further characterized by composing an ink jet printer head by covering the passages by bonding a substrate to the upper surface of the partition walls in the passage members, comprising a heating element in each passage, and generating bubbles in the ink in the passages by the heat of the heating elements, thereby discharging the ink.

In the invention, a mixture for partition wall material is filled into a prepared molding die having grooves conforming to the shape of partition walls, and this mixture is bonded and integrated to one side of the flat plates to obtain partition walls, so that the shape of the molding die is directly transferred onto the flat plates. Therefore, when the molding die is preliminarily fabricated at high density and high precision, the partition walls can be easily formed at high density and high precision.

In one ore more embodiments of the invention, the surface of the molding die and the partition walls are smoothly formed to obtain passages having smooth inner surfaces. The procedure of bonding and integrating the partition walls and flat plates comprises steps of filling the molding die having the grooves with mixture, solidifying tightly on the flat plates, and parting and baking, or the steps of filling the molding die with the mixture, solidifying, parting, contacting with the flat plate, and baking, or the steps of filling the molding die with the mixture, solidifying, parting, baking, and contacting or thermally bonding to the flat plate. Besides, the general glass and ceramics bonding method may be employed.

In one or more embodiments, the invention relates to an ink jet printer head comprising plural ink chambers, ejection ports communicating with the ink chambers, and a diaphragm for applying a pressure to the ink chambers, in which the diaphragm is formed of a voltage-withstanding inorganic material, whereby a piezoelectric element is bonded to the diaphragm and a driving electrode is formed on the piezoelectric element.

It is also a feature of the invention that the conductive inorganic material for composing the diaphragm has a volume specific resistance of $1\times10^{-1}$ Σθcm or less. Moreover, the conductive inorganic material for composing the diaphragm of the invention is composed of any one of conductive ceramics, ceramics or glass having conductive agent, and thermet.

In the ink jet printer head of the invention, the diaphragm is composed of conductive inorganic material, and this diaphragm is used also as the lower electrode, so that the lower electrode is not needed. By applying a driving voltage between the diaphragm and driving electrode, the piezoelectric element can be deformed. Accordingly, the manufacturing process of the lower electrode can be omitted and the manufacturing process can be simplified; moreover, the deformation of the piezoelectric element can be transmitted to the diaphragm efficiently.

Still more, by forming the diaphragm by an inorganic material such as ceramics and glass, the corrosion resistance can be enhanced, and the piezoelectric element can be bonded directly without resort to bonding agent, so that the deformation of the piezoelectric element can be transmitted to the diaphragm more efficiently.

BRIEF DESCRIPTION OF THE DRAWINGS

FIG. 2(*b*) shows a sectional view of FIG. 2(*a*).

DETAILED DESCRIPTION OF THE INVENTION

Figure 1:
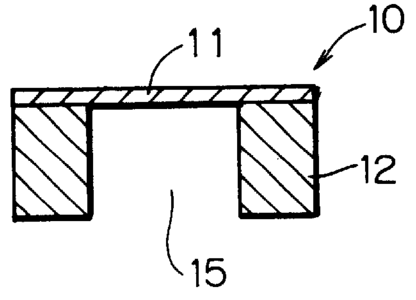
FIG. 1 is a sectional view showing a member having an ultrafine groove of the invention.
Figure 2:
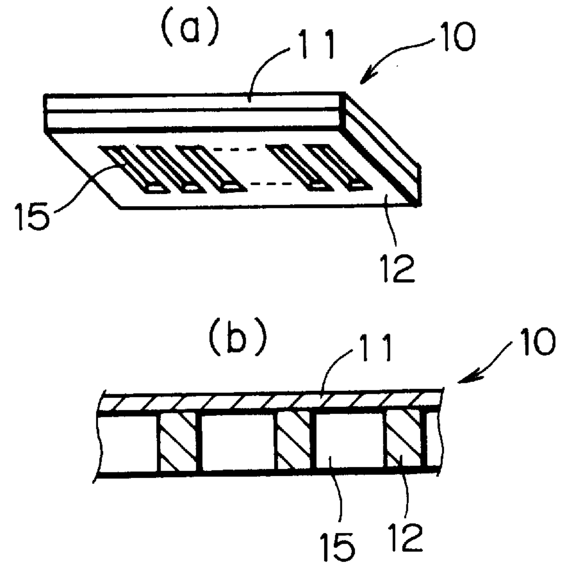
FIG. 2(*a*) shows a perspective view of an embodiment of the invention.

FIG. 1 illustrates a sectional view of the invention. In one or more embodiments of the invention, a member 10 having an ultrafine groove comprises partition walls 12 made of glass, ceramics, silicon or other suitable material, wherein partition walls 12 are bonded and integrated to one side of a flat plate 11 made of glass, ceramics, silicon or other material, forming one ultrafine groove 15 between partition walls 12. Referring to FIG. 2, in one or more embodiments of the invention, multiple partition walls 12 made of glass, ceramics, silicon or other material are bonded and integrated to one side of a flat plate 11 made of glass, ceramics, silicon or other material, and plural ultrafine grooves 15 are formed between partition walls 12.

Figure 3:
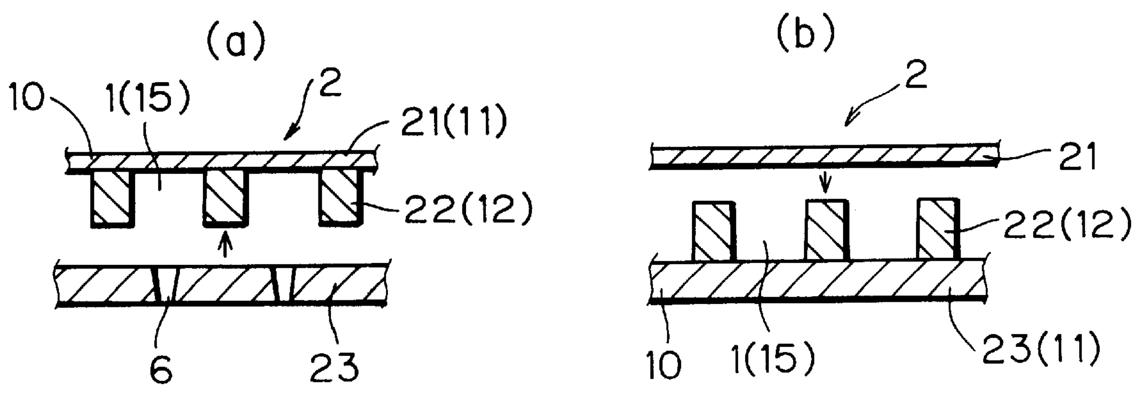
FIGS. 3(*a*) and 3(*b*) are sectional views showing the process of manufacturing a head substrate of an ink jet printer head, by using the member having an ultrafine groove of the invention.

As specifically described below, partition walls 12 are formed by using a molding die, bonded and integrated to the flat plate 11, and are hence formed at high density and high precision. By using such member 10 having an ultrafine groove, a head substrate 2 of an ink jet printer head can be fabricated. Referring to FIG. 3(*a*), the flat plate 11 is formed as a diaphragm 21, partition walls 12 as partition walls 22. A separately fabricated nozzle plate 23 having nozzles 6 is bonded to partition walls 22 so that ultrafine grooves 15 form as ink chambers 1, creating head substrate 2. As shown in FIG. 3(*b*), forming nozzles 6 in the flat plate 11 forms a nozzle plate 23. Partition walls 12 are formed as partition walls 22, and a separately fabricated diaphragm 21 is bonded; therefore, the ultrafine grooves 15 are formed as ink chambers 1, and the head substrate 2 is obtained. Because partition walls 22 (12) are formed at high density and high precision, by using this head substrate 2, an ink jet printer head of high density and high precision can be obtained.

Alternatively, as shown in FIG. 3(*a*), when the flat plate 11 of the member 10 having ultrafine grooves is formed as a diaphragm, a piezoelectric element can be formed on the flat plate 11. That is, as shown in FIG. 4(*a*), by laminating the electrode 14 and piezoelectric element 13 on the flat plate 11 either in a single layer or in plural layers, when a voltage is applied between the electrodes 14, the piezoelectric element 13 is deformed and the flat plate 11 is displaced, so that it can act as a diaphragm.

Figure 4:
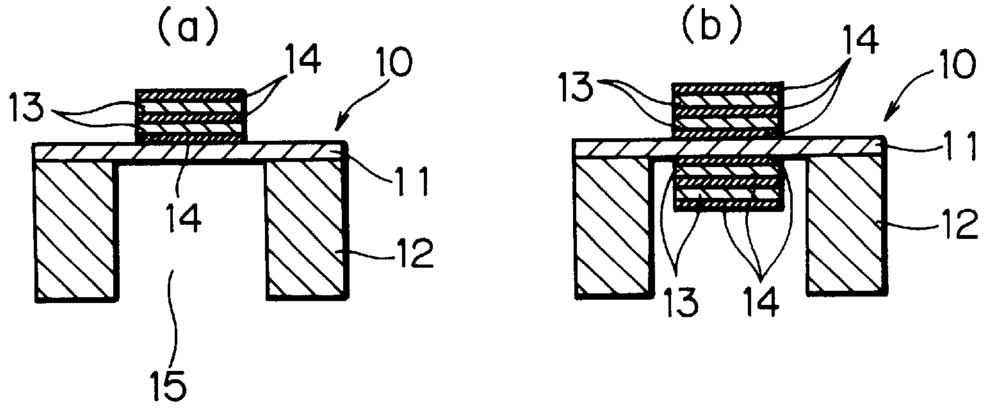
FIGS. 4(*a*) and (*b*) are sectional views showing a different embodiment of the invention.

Moreover, as shown in FIG. 4(*b*), the electrode 14 and piezoelectric element 13 can be laminated on the upper and lower side of the flat plate 11 either in a single layer or in plural layers. A partition wall 12 is formed of a piezoelectric material. An electrode can be placed on the upper and lower side of a partition wall 12 or on both sides of a partition wall 12 to displace partition wall 12 by applying a voltage to the partition wall 12 through the electrode. Partition wall 12 can be used to form a diaphragm.

When the flat plate 11 is provided with the piezoelectric element 13 and electrode 14, or an electrode 14 is provided with the partition wall 12 formed of a piezoelectric material, then member 10 having ultrafine grooves is used as an actuator; hence, not limited to the ink jet printer head alone, it can be used in a displacement control element, motor, relay, switch, shutter, printer head, pump, or fan.

Figure 5:
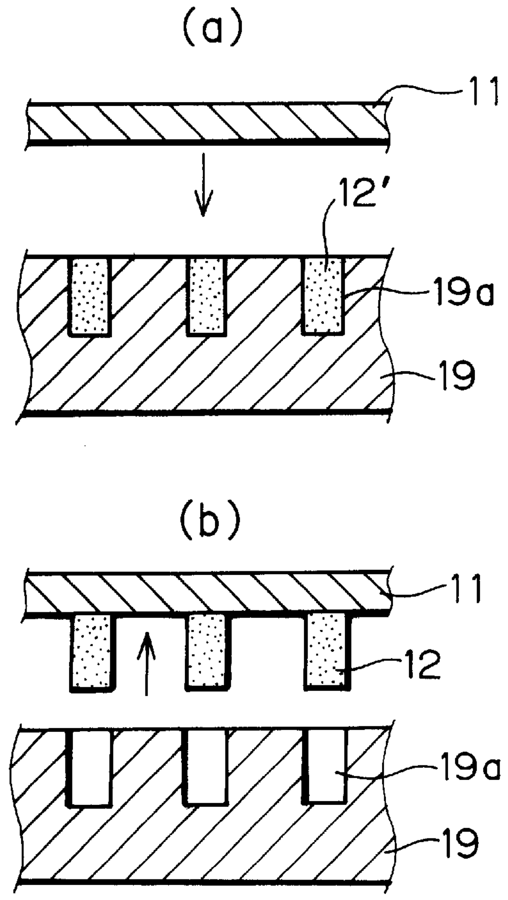
FIGS. 5(*a*) and (*b*) are sectional views for explaining a manufacturing method of a member having an ultrafine groove of the invention.

The manufacturing method of the member 10 having ultrafine grooves is described below. First, as shown in FIG. 5(*a*), a molding die 19 having a recess 19*a* conforming to the shape of a partition wall 12 is prepared. Then, the recess 19*a* of the molding die 19 is filled with a mixture 12' of powder of ceramics, glass, silicon or the like and a binder composed of solvent and organic additive as a material for composing the partition walls 12. A flat plate 11 composed of ceramics, glass, silicon or the like is separately prepared, and the molding of the mixture 12' is bonded and integrated to this flat plate 11, thereby forming the partition walls 12. More specifically, the manufacturing procedure is as follows.

The flat plate 11 is pressed and adhered to the surface of the mixture 12' filling up the molding die 19, and the mixture 12' is solidified by curing reaction or drying. Then, as shown in FIG. 5(*b*), by parting the molding die 19, the partition wall 12 made of the molding of the mixture 12' is transferred to the substrate 11. Finally, the entire piece is removed from the binder and baked and integrated simultaneously, so that the member 10 having ultrafine grooves, as shown in FIG. 1 and FIG. 2, is manufactured.

In another embodiment of the invention, after solidifying the mixture 12' by reaction curing or drying, it is parted from the molding die 19, and the molding of the mixture 12' is affixed to the flat plate 11. Finally, the entire piece is removed of binder and baked and integrated at the same time, thereby obtaining the member 10 having an ultrafine groove.

In a different method, after solidifying the mixture 12' by reaction curing or drying, the mixture 12' is parted from the molding die 19 and removed of the binder, and this molding is adhered to the flat plate 1. Finally, the entire piece is simultaneously baked and integrated, thereby obtaining the member 10 having an ultrafine groove.

Alternatively, after solidifying the mixture 12' filling up the molding die 19 by reaction curing or drying, it is parted from the molding die 19 and removed of the binder and baked; the obtained sinter is bonded to the flat plate 11 by adhering, thermal compression or simultaneous baking, thereby obtaining the member 10 having an ultrafine groove.

The molding of the mixture 12' may be bonded to the flat plate 1I1 at any stage in an unbaked state, binder-removed state, or sintered state. Accordingly, partition walls 12 can be formed easily, and hence the manufacturing process may be extremely simplified. Further, since the partition walls 12 and their space are transferred from the shape of the recess 19*a* of the molding die 19, the specified partition walls 12 can be formed easily by processing the recess 19*a* precisely according to the specified shape.

Figure 6:
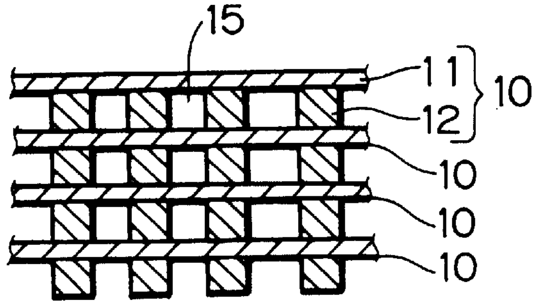
FIG. 6 is a sectional view showing an application example of the member having ultrafine grooves of the invention.
Figure 7:
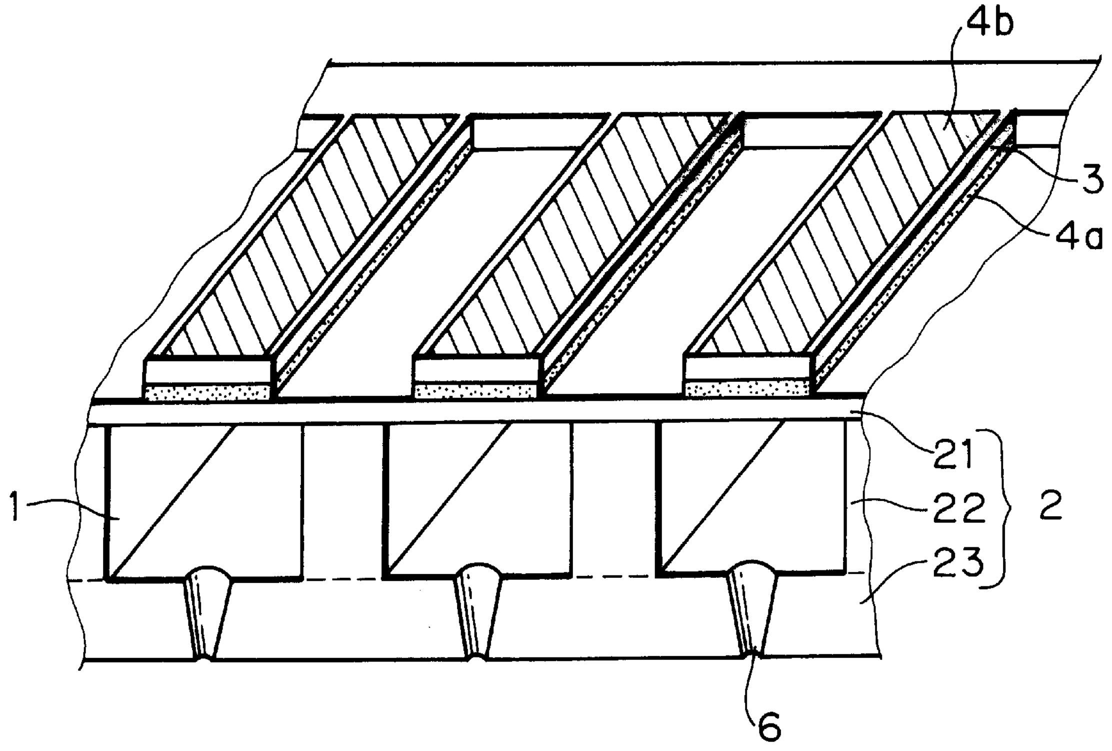
FIG. 7 is a cross-sectional view showing a structure of an ink jet printer head.

In another embodiment of the invention, as shown in FIG. 6, by laminating, bonding and integrating member 10 having plural ultrafine grooves, a honeycomb structure having each ultrafine groove 15 as a penetration hole is obtained, and it can be used in ultrafine filters or the like. In addition, the member IQ having ultrafine grooves of the invention can be applied in various fields. The ceramics powders usable for forming the flat plate 11 and partition wall 12 include alumina ($Al_2O_3$), zirconia ($ZrO_2$), other oxide-type ceramics, silicon nitride ($Si_3N_4$), aluminum nitride (AlN), silicon carbide (SiC), other non-oxide ceramics, apatite ($Ca_5(PO_4)_3$(F, Cl, OH)), and others. These ceramics powders may be combined with a specific amount of various sintering aids.

The usable sintering aids include silica ($SiO_2$), calcia (CaO), yttria ($Y_2O_3$), magnesia (Mg), and others for alumina powder, yttria ($Y_2O_3$), cerium (Ce), dysprosium (Dy), ytterbium (Yb), and other rare earth element oxides for zirconia powder, yttria ($Y_2O_3$), alumina ($Al_2O_3$) and others for silicon nitride powder, oxide of element of periodic table group 3*a* ($RE_2O_3$) and others for aluminum nitride powder, and boron (B), carbon (C) and others for silicon carbide powder, which may be added by a specified amount individually.

For the glass powder for forming the flat plate 11 and partition wall 12, various glass materials (mainly composed of silicate and containing at least one of lead (Pb), sulfur (S), selenium (Se), alum and others) may be used. Moreover, the flat plate 11 and partition wall 12 may be also formed from the silicon powder. The flat plate 11 and partition wall 12 may be formed from a compound powder of various materials or other powders having similar characteristics as specified above. The particle size of the powders of ceramics, glass, silicon and others is preferably scores of microns to sub-micron, and more specifically 0.2 to 10 microns, or preferably in a range of 0.2 to 5 microns.

The organic additive added to powders of ceramics, glass or silicon, for example, include: urea resin, melamine resin, phenol resin, epoxy resin, unsaturated polyester resin, alkyd resin, urethane resin, ebonite, silicate polysiloxane. Means for curing these organic additives by reaction may include heat curing, ultraviolet ray irradiation curing or X-ray irradiation curing. From the standpoint of working efficiency and equipment, heat curing is optimum, and in particular, the unsaturated polyester resin is preferred from the viewpoint of pot life.

The content of the organic additive must be controlled so that the viscosity may not be too high, in order to maintain the flowability and moldability of the mixture of powders of ceramics, glass, silicon or the like and the sintering aids. When curing, however, a sufficient shape-retaining property is desired. The content of the organic additive is preferably 0.5 part by weight or more in 100 parts by weight of powder of ceramics, glass, silicon or the like. For the purpose of shrinking the molding by curing, the content of the organic additive should be more preferably 35 parts by weight or less, and in particular, considering the shrinking when baking, it should be most preferably in a range of 1 to 15 parts by weight.

The solvent to be added in the mixture 12' is not particularly limited as far as it is compatible with the organic additives. Usable examples include toluene, xylene, benzene, ester phthalate and other aromatic solvents, hexanol, octanol, decanol, oxy alcohol and other higher alcohols, and ester acetate, glycerides and other esters. In particular, ester phthalate and oxyl alcohol are preferably used, and two or more kinds of solvents nay be used in order to evaporate the solvents slowly.

In one or more embodiments of the invention, the content of the solvent is required to be 0.1 part by weight or more in 100 parts by weight of the powder of ceramics, glass, silicon or the like, for example, in order to maintain the shape-retaining property of the molding. To enhance the molding performance, the content of the solvent is more preferably 35 parts by weight, for example, or less in order to lower the viscosity of the mixture of the powder of ceramics, glass, silicon or the like and organic additive, and most preferably 1 to 15 parts by weight in consideration of shrinkage when drying and baking. The molding die 19 in the invention is not particularly limited in material as far as it is free from problem when curing the organic additive, and for example, metal, resin or rubber may be used, and if necessary, surface coating or surface treatment may be applied to enhance the parting performance or prevent abrasion.

The flat plate 11 is an unbaked green sheet or a sinter of ceramics, glass, silicon, or the like, and, for example, by using various ceramic green sheets, various glass substrates, ceramic substrates, or the like, the same material as the partition wall 12 or a material similar in the coefficient of thermal expansion is used. As the glass substrate, for example, soda lime glass or a relatively inexpensive glass-dispersing inorganic filler for enhancing its distortion point may be used. Moreover, in order to enhance the adhesion for compression bonding of the mixture 12' and flat plate 11, various coupling agents may be used, such as silane-coupling agent, titanate coupling agent, and aluminate coupling agent may be used, and the silane coupling agent is particularly preferred among them because the reactivity is high.

For compression bonding of the mixture 12' and flat plate 11, it is preferred to use an apparatus of static water pressure. The pressure should be in a range not to deform the molding die 19, and this pressure range varies with the strength of the molding die 19. For example, when the molding die 19 made of silicon rubber is used, it is preferred to apply a pressure of about 100 g/cm$^2$. In the mixture 12, in order to enhance the dispersion of the ceramics or glass powder, it may be also blended with, for example, polyethylene glycol ether, alkyl sulfonate, polycarbonate, alkyl ammonium salt, and other surface active agent, and the content thereof is preferred to be 0.05 to 5 parts by weight in 100 parts by weight of ceramics or glass powder from the viewpoint of enhancement of dispersion and pyrolysis.

The binder in the mixture 12' may be blended with a curing catalyst known as a curing reaction promoter or polymerization initiator. As the curing catalyst, organic peroxide or azo compound may be used, and examples include ketone peroxide, diacyl peroxide, peroxy ketal, peroxy ester, hydroperoxide, peroxy carbonate, t-butyl peroxy-2-ethyl hexanoate, bis (4-t-butyl cyclo hexyl) peroxy dicarbonate, dicumyl peroxide, other organic peroxides, azo bis, isobutyl nitrile, and other azo compound. The piezoelectric element 13 is composed of a material which is deformed when a voltage is applied from the electrode 14. Piezoelectric ceramics mainly composed of at least one of lead titanate-zirconate (PZT series), lead magnesium niobate (PMN series), lead nickel niobate (PNN series), lead manganese niobate, and lead titanate may be used.

Moreover, electrodes 14 for driving, disposed at both sides of the piezoelectric element 13, are not particularly defined as far as a conductor withstanding the baking temperature. For example, metal alone, alloy, or mixture of ceramics or glass and alloy with metal may be used. In particular, it is preferred to use at least one of platinum, palladium, rhodium, silver-palladium, silver-platinum, platinum-palladium, gold, silver, tungsten, and molybdenum. In the following, various embodiments of the invention are described. It should be noted, however, that these embodiments are provided by way of example only, and the scope of the invention should not be limited by the specific details described herein.

Embodiment 1

In one embodiment of the invention, the member 10 having ultrafine grooves of the invention shown in FIG. 2 was experimentally fabricated. The ceramics powder for forming the partition wall 12 was mainly composed of alumina ($Al_2O_3$), zirconia ($ZrO_2$), silicon nitride ($Si_3N_4$), and aluminum nitride (AlN) with mean particle size of 0.2 to 5 microns, and was blended with known baking aids mentioned above as required. In 100 parts by weight of these ceramic powders, the binder composition as shown in Table 1 was added and mixed, the ceramics forming composition was prepared, and the mixture 12' was obtained. The kinds of binder composition shown in Table 1 are shown in Table 2.

TABLE 1

| | Binder composition | | | | | | | |
|---|---|---|---|---|---|---|---|---|
| | Ceramic | Solvent | | Organic additive | | Other additive | | |
| No. | powder principal ingredient | Kind | Added parts by weight | Kind | Added parts by weight | Kind | Added parts by weight | Remarks |
| 1 | ① | ① | 10 | ② | 15 | Dispersant | 2 | Ester phosphate |
| 2 | ① | ② | 10 | ① | 15 | — | — | |
| 3 | ① | ② | 10 | ② | 15 | Dispersant | 2 | Ester phosphate |
| 4 | ① | ② | 10 | ② | 20 | Dispersant | 2 | Ester phosphate |
| 5 | ② | ② | 10 | ② | 15 | Dispersant | 2 | Dodecyl- |
| 6 | ③ | ② | 15 | ② | 15 | — | — | polyethylene glycol |
| 7 | ④ | ② | 10 | ② | 15 | Dispersant | 2 | Dodecyl-polyethylene glycol |

TABLE 2

| | Symbol | Substance name |
|---|---|---|
| Ceramic powder principal ingredient | ① | Alumina |
| | ② | Zirconia |
| | ③ | Silicon nitride |
| | ④ | Aluminum nitride |
| Solvent | ① | Diethyl phthalate |
| | ② | Octanol |
| Organic additive | ① | Epoxy resin |
| | ② | Unsaturated polyester |

After vacuum defoaming of obtained mixture 12, it was injected to fill up the recess 19*a* of the molding die 19 made of silicon resin as shown in FIG. 5(*a*). Then, on the surface of the mixture 12' that filled up the molding die 19, a flat plate 11 of the same ceramic sinter as the mixture 12' was applied, and this flat plate 11 was put in a heating oven, together with the molding die 19, while pressurizing at 100 g/cm$^2$, and heated and cured by holding for 45 minutes at a temperature of 100° C.

After completion of curing, as shown in FIG. 5(*b*), the partition wall 12 in contact with the flat plate 11 was parted from the molding die 19, dried for 5 hours at 120° C., held in a nitrogen atmosphere for 3 hours at 250° C., and heated to 500° C. for 12 hours to remove the binder. Afterwards, the piece mainly composed of alumina was held in the atmosphere for 2 hours at 1600° C. The piece mainly composed of zirconia was held in the atmosphere for 2 hours at 1450° C. The piece mainly composed of silicon nitride was held in a nitrogen atmosphere for 10 hours at 1650° C. The piece mainly composed of aluminum nitride was held in a nitrogen atmosphere for 3 hours at 1800° C. The member 10 having ultrafine grooves of the invention shown in FIG. 2 was obtained by baking and integrating.

As comparative examples, a ceramic green sheet mainly composed of zirconia was prepared, laminated by blanking the recess by the die, baked and integrated. Members 10 having ultrafine grooves of similar shape were prepared. The thickness of the ceramic green sheet was 100 microns (No. 8 in Table 3) and 40 microns (No. 9 in Table 3). In these embodiments of the invention and comparative examples, results of observation of the shape of partition walls 12 are shown in Table 3.

As known from the results, in comparative example No. 8, although the thickness of the green sheet is greater than the width of the partition wall 12 and the strength of the partition wall 12 is sufficient, it was deformed by force when blanking with the die. In comparative example No. 9, since the green sheet is thin, the force when blanking with the die is small, but it was easily deformed as in No. 8. Still worse, in these comparative examples, a step was formed in the partition wall 12, due to deviation of position when laminating. Incidentally, the limit of the width of the partition wall 12 was 70 microns, and the yield was low.

By contrast, in Nos. 1 to 7 of the invention, such problems were not found, and the width of the partition wall 12 could be formed at less than 70 microns, and the shape was not deformed and the precision was high.

TABLE 3

| No. | Shape of partition wall | Width of partition wall |
|---|---|---|
| 1 | Excellent | 70 microns or more |
| 2 | Excellent | 70 microns or more |
| 3 | Excellent | 70 microns or more |
| 4 | Excellent | 70 microns or more |
| 5 | Excellent | 70 microns or more |
| 6 | Excellent | 70 microns or more |
| 7 | Excellent | 70 microns or more |
| *8 | Step and deformation found | 80 microns |
| *9 | Step and deformation found | 70 microns |

*Comparative example

In one or more embodiments of the invention, the molding die 19 was filled with the mixture 12', and the flat plate 11 was pressed to heat and cure, but, instead, by parting and baking after filling the molding die 19 with the mixture 12' and heating and curing, it may be adhered to the flat plate and integrated. In short, in bonding of the partition wall 12 and flat plate 11, both may be done before baking, one before baking and the other after baking, or both after baking. Anyway, the flat plate 11 and partition wall 12 are preferred to be closer in baking temperature and coefficient of thermal expansion. The material for the flat plate 11 and partition wall 12 is not limited to the ceramics mentioned above, but the same effects were confirmed by using other ceramics, various types of glass, silicon, etc.

Embodiment 2

Selecting No. 5 from Embodiment 1, the electrode 14 was applied in the upper surface of the flat plate 11 of the member 10 having ultrafine grooves fabricated therefrom, and the piezoelectric element 13 made of PZT was laminated, the electrode 14 was further applied and baked at 1000 to 1300° C., thereby obtaining a member for the actuator used in an ink jet printer head and the like. After the polarization process, a voltage was applied to drive, the flat plate 11 was displaced, and a favorable driving state was obtained. Moreover, as shown in FIG. 4(*a*), the same effects were obtained by laminating plural piezoelectric elements 13 as shown in FIG. 4(*a*). Moreover, as shown in FIG. 4(*b*), on both sides of the flat plate 11 of the member 10 having ultrafine grooves, the electrode 14 and piezoelectric element 13 were laminated, the driving test was conducted similarly, and favorable driving was confirmed.

As mentioned above, according to the invention, by bonding and integrating a partition wall formed by forming a powder of ceramics, glass, silicon or the like on one side of a flat plate made of ceramics, glass, silicon or the like, by using a molding die having a recess, the member having ultrafine grooves of high density and high precision can be obtained in a simple process. Also according to the invention, by manufacturing a member having an ultrafine recess from the process for applying a mixture of powders of ceramics, glass, silicon or the like and a binder composed of solvent and organic additive into a molding die having a recess for partition, and bonding and integrating this mixture to a flat plate made of ceramics, glass, silicon or the like, the shape of the molding die is directly transferred onto the flat plate. Therefore, by preparing the molding die at high density and high precision, the partition wall can be easily formed at high density and high precision.

According to one or more embodiments of the invention, the member having ultrafine grooves of high density and high precision can be manufactured in an extremely simple process; hence, it may be preferably used in an application of an ink jet printer head or the like. In an embodiment of the invention, a passage member is formed by enclosing parallel partition walls between a substrate plate and a flat plate as described below.

Figure 8:
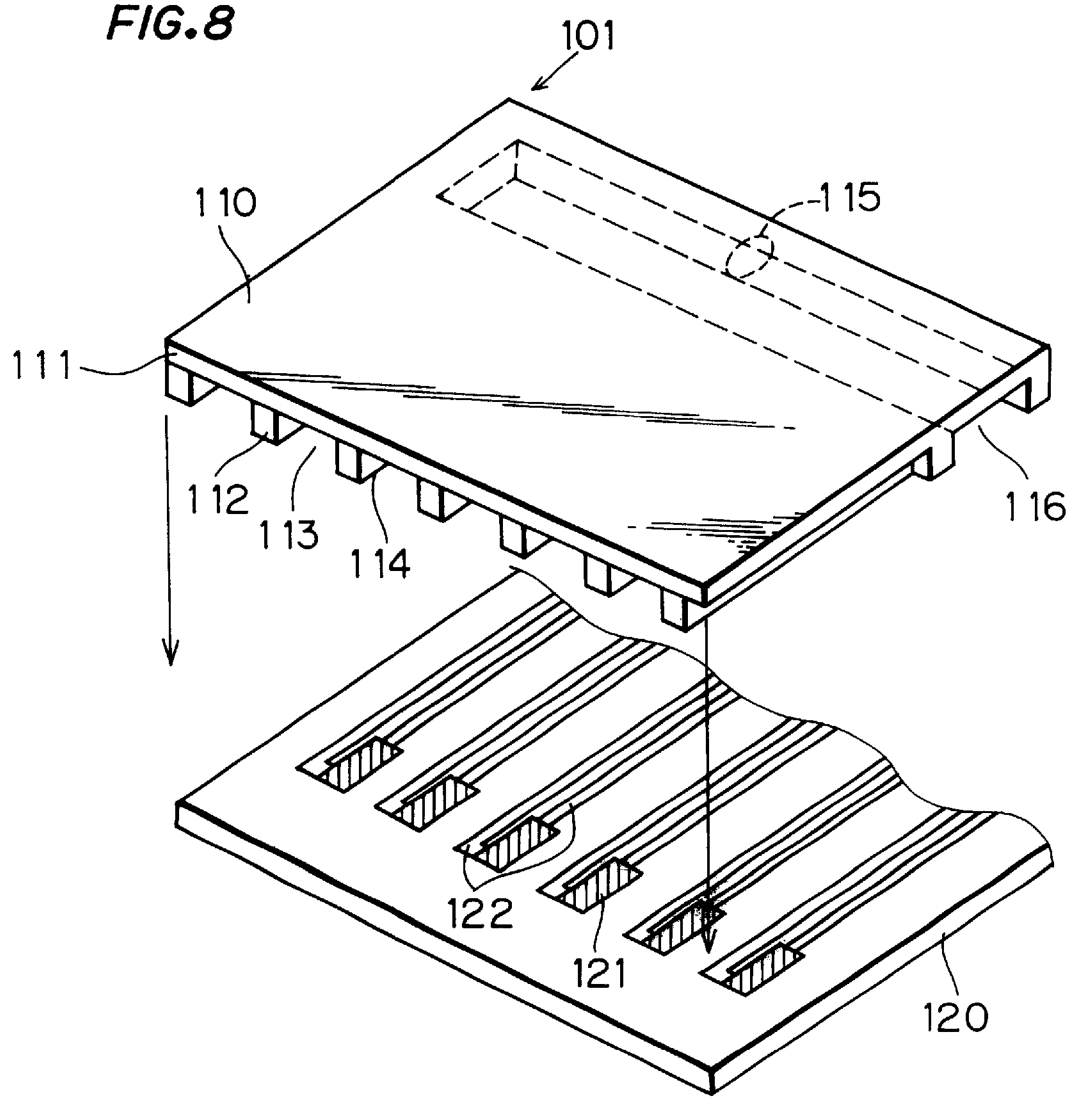
FIG. 8 is a schematic perspective exploded view of an ink jet printer head using passage members of the invention.

Referring to FIG. 8, an ink jet printer head 101 is comprised of a flat plate 111 made of one of glass, ceramics, silicon or other suitable material, plural partition walls 112 made of one of glass, ceramics, silicon or other suitable material, and passage member 110. Passage member 110 comprises passages 113 formed between partition walls 112. In the passage member 110, a substrate 120 is bonded to the lower surface of each partition wall 112 to cover passages 113. At one end of each passage 113 is a discharge port 114, and the other end communicates with an ink chamber 116 having an ink feed hole 115. At the position corresponding to each passage 113 of the substrate 120, a heating element 121 and an electrode 122 for energizing the heating element 121 are provided.

Figure 9:
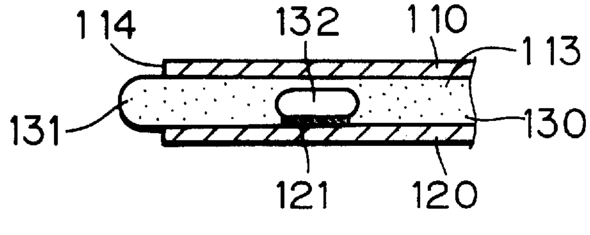
FIG. 9 is a longitudinal sectional view near the discharge port of the ink jet printer head in FIG. 8.

Further, as shown in FIG. 9, energizing the heating element 121 generates heat in the passage 113 filled with ink 130 and through the ink chamber 116. As a result, bubbles 132 are generated in the ink 130, and ink drops 131 are discharged from the discharge port 114 by force of the bubbles 132 expanding in volume. As specifically described below, after forming the partition wall 112 by using the molding die, it is bonded and integrated to the flat plate 111; therefore, it can be formed at high density and high precision, and the ink jet printer head 101 of extremely high performance is realized.

Figure 10:
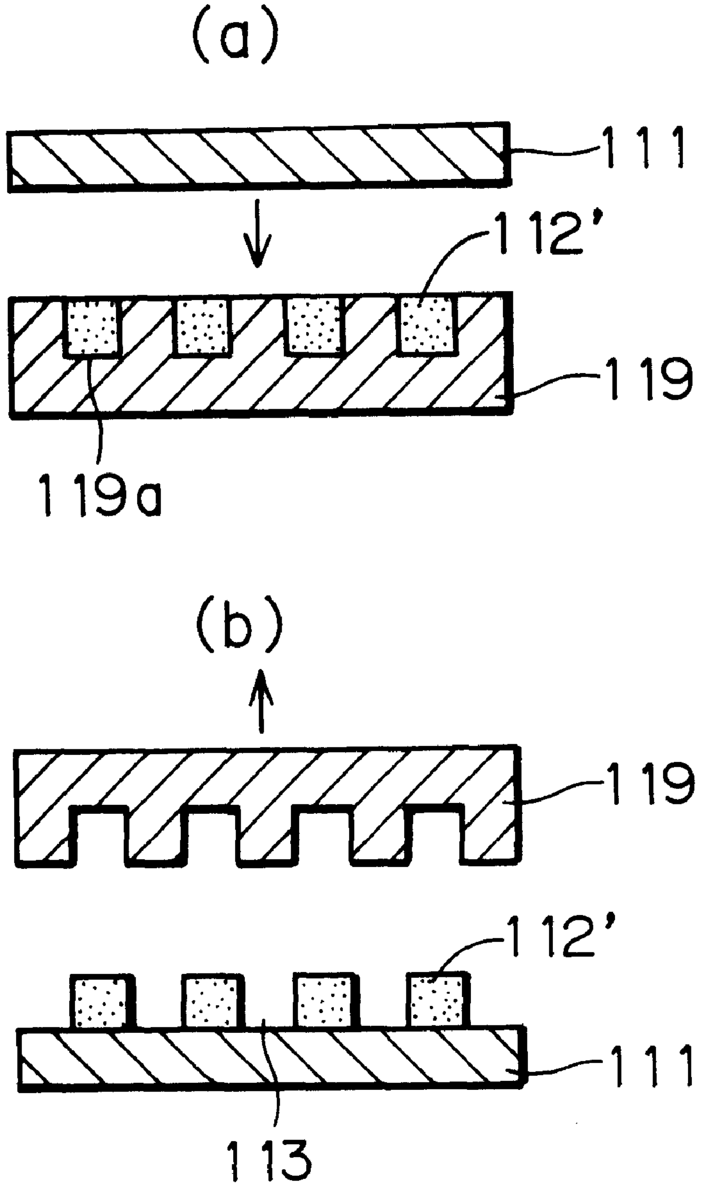
FIGS. 10(*a*) and (*b*) are sectional views for explaining a manufacturing method of passage members of the invention.

One or more embodiments of the invention are directed to a method for manufacturing the passage member 110. First, as shown in FIG. 10(*a*), a molding die 119 having a recess 119*a* conforming to the shape of the partition wall 112 is prepared, and the recess 119*a* of the molding die 119 is filled with a mixture 12' of powder of ceramics, glass, silicon or the like and a binder of solvent and organic additive as the material for forming the partition wall 112. A flat plate 111 made of ceramics, glass, silicon or the like is prepared separately. The molding of the mixture 12' is bonded and integrated to the surface of the flat plate 111, and the partition wall 112 is formed.

The flat plate 111 is pressed and adhered to the exposed surface of the mixture 112' filling up the molding die 119. The mixture 112' is solidified by reaction curing or drying. As shown in FIG. 10(*b*), by rotating the molding die 119 along its horizontal axis by approximately 180°, the partition wall 112 made of the molding of the mixture 112' is transferred to the flat plate 111. Finally, removing the binder from the whole structure, the passage member 110 is manufactured by baking and integrating simultaneously as shown in FIG. 8.

In another embodiment of the invention, the mixture 112' filling the molding die 119 is solidified by reaction curing or drying, and parted from the molding die 119, and the molding of the mixture 112' is affixed to the flat plate 111. Finally, removing the binder from the whole structure, and baking and integrating simultaneously, the member 110 having ultrafine grooves is obtained.

In a different method, the mixture 112' filling the molding die 119 is solidified by reaction curing or drying, and parted from the molding die 119, and after removing the binder, the molding is adhered to the flat plate 111. Finally, the whole structure is baked and integrated simultaneously, and the member 110 having ultrafine grooves is obtained.

Alternatively, the mixture 112' filling the molding die 119 is solidified by reaction curing or drying, and parted from the molding die 119, removed the binder and baked, and this sinter is bonded to the flat plate 111 by adhesion, thermal compression bonding, or simultaneous baking, so that the member 110 having ultrafine grooves is obtained. The molding of the mixture 112' may be bonded to the flat plate 111 in any stage of both members being in unbaked state, binder removed state, or sinter state.

According to such manufacturing methods of the invention, since the partition walls 112 can be formed easily, the manufacturing process can be simplified extremely. Moreover, the partition walls 112 and their space of passage 113 are formed by transfer of the shape of the recess 119*a* of the molding die 119; therefore, the specified partition walls 112 can be formed easily only by processing the recess 119*a* precisely in a specified shape.

The surface roughness of the passage member 113 obtained in this way is exactly the same as the surface roughness of the molding die 119. Therefore, when the surface roughness ($R_{max}$) of the molding die 119 is small preliminarily, the surface roughness ($R_{max}$) of the obtained passage member 113 may be 0.01 to 0.8 microns, for example, so that the ink 130 may be supplied smoothly. The surface roughness ($R_{max}$) of the passage member 113 is defined within 0.01 to 0.8 microns because it is extremely difficult to process within 0.01 micron, and if exceeding 0.8 microns, the flow of the ink 130 is disturbed and the discharge amount and response tend to fluctuate.

Moreover, in an example in FIG. 10, the side surface of the partition wall 112 is vertical to the flat plate 111, but the side surface may be also formed in a slope or curvature so that the partition wall 112 may be gradually reduced in thickness. The ceramics powder for forming the flat plate 111 and partition wall 112 may include alumina ($Al_2O_3$), zirconia ($ZrO_2$), other oxide-type ceramics, silicon nitride ($Si_3N_4$), aluminum nitride (AlN), silicon carbide (SiC), other non-oxide type ceramics, apatite ($Ca_5(PO_4)_3$(F, Cl, OH)), and others, and these ceramics powders may be combined with a specific amount of various sintering aids.

The usable sintering aids include silica ($SiO_2$), calcia (CaO), yttria ($Y_2O_3$), magnesia (MgO), and others for alumina powder, yttria ($Y_2O_3$), cerium (Ce), dysprosium (Dy), ytterbium (Yb), and other rare earth element oxides for zirconia powder, yttria ($Y_2O_3$), alumina ($Al_2O_3$) and others for silicon nitride powder, oxide of element of periodic table group 3*a* ($RE_2O_3$) and others for aluminum nitride powder, and boron (B), carbon (C) and others for silicon carbide powder, which may be added by a specified amount individually.

As the glass powder for forming the flat plate 111 and partition wall 112, various glass materials (mainly composed of silicate and containing at least one of lead (Pb), sulfur (S), selenium (Se), alum and others) may be used. Moreover, the flat plate 111 and partition wall 112 may be also formed from the mixture 12' powder. Alternatively, the flat plate 111 and partition wall 112 may be formed from a compound powder of various materials, or other powders having similar characteristics as specified above. The particle size of the powder of ceramics, glass, silicon and others is preferably scores of microns to sub-micron, and more specifically 0.2 to 10 microns, or preferably in a range of 0.2 to 5 microns.

The organic additive to be added to these powders of ceramics, glass or silicon may include, for example, urea resin, melamine resin, phenol resin, epoxy resin, unsaturated polyester resin, alkyd resin, urethane resin, ebonite, silicate polysiloxane, and other comparable additives. Means for curing these organic additives by reaction may include heat curing, ultraviolet ray irradiation curing or X-ray irradiation curing. For efficiency and preservation of equipment, heat curing is optimum, and the unsaturated polyester resin is preferred from the viewpoint of pot life.

The content of the organic additive must be controlled so that the viscosity may not be too high in order to maintain the flowability and moldability of the mixture of powders of ceramics, glass, silicon or the like and the sintering aids. When curing, on the other hand, a sufficient shape-retaining property is desired. For example, the content of the organic additive is preferably 0.5 part by weight or more in 100 parts by weight of powder of ceramics, glass, silicon or the like. For shrinking of the molding by curing, the content of the organic additive should be more preferably 35 parts by weight or less, and in particular, considering the shrinking when baking, it should be most preferably in a range of 1 to 15 parts by weight.

The solvent to be added in the mixture 112' is not particularly limited as far as it is compatible with the organic additives, and usable examples include toluene, xylene, benzene, ester phthalate and other aromatic solvents, hexanol, octanol, decanol, oxy alcohol and other higher alcohols, and ester acetate, glycerides and other esters.

In particular, ester phthalate and oxyl alcohol are preferably used, and two or more kinds of solvents may be used in order to evaporate the solvents slowly. The content of the solvent is required to be 0.1 part by weight or more in 100 parts by weight of the powder of ceramics, glass, silicon or the like in order to maintain the shape-retaining property of the molding. From the viewpoint of molding performance, it is more preferably 35 parts by weight or less in order to lower the viscosity of the mixture of the powder of ceramics, glass, silicon or the like and organic additive, and most preferably 1 to 15 parts by weight in consideration of shrinkage when drying and baking The molding die 119 in the invention is not particularly limited in material as far as it is free from problems when curing the organic additive, and for example, metal, resin or rubber may be used, and if necessary, surface coating or surface treatment may be applied to enhance the parting performance or prevent abrasion. The flat plate 111 is an unbaked green sheet or a sinter of ceramics, glass, silicon, or the like, and, for example, by using various ceramic green sheets, various glass substrates, ceramic substrates, or the like, the same material as the partition wall 112 or a material similar in the coefficient of thermal expansion is used. As the glass substrate, for example, soda lime glass, or relatively inexpensive glass dispersing inorganic filler for enhancing its distortion point may be used.

Moreover, in order to enhance the adhesion for compression bonding of the mixture 112' and flat plate 111, various coupling agents may be used such as a silane coupling agent, titanate coupling agent, and aluminate coupling agent. The silane coupling agent is particularly preferred among them because the reactivity is high. For compression bonding of the mixture 112' and flat plate 111, it is preferred to use an apparatus of static water pressure from the viewpoint of applying a uniform pressure. As the pressurizing condition, the pressure should be in a range not to deform the molding die 119. This pressure range varies with the strength of the molding die 119, and for example, when the molding die 119 made of silicon rubber is used, it is preferred to apply a pressure of about 100 g/cm$^2$.

In the mixture 112', in order to enhance the dispersion of the ceramics or glass powder, it may be also blended with, for example, polyethylene glycol ether, alkyl sulfonate, polycarbonate, alkyl ammonium salt, and other surface active agents. The content thereof is preferred to be 0.05 to 5 parts by weight in 100 parts by weight of ceramics or glass powder from the viewpoint of enhancement of dispersion and pyrolysis. The binder in the mixture 112' may be blended with a curing catalyst known as curing reaction promoter or polymerization initiator. As the curing catalyst, organic peroxide or azo compound may be used, and examples include ketone peroxide, diacyl peroxide, peroxy ketal, peroxy ester, hydroperoxide, peroxy carbonate, t-butyl peroxy-2-ethyl hexanoate, bis (4-t-butyl cyclo hexyl) peroxy dicarbonate, dicumyl peroxide, other organic peroxides, azo bis, isobutyl nitrile, and other azo compounds.

The material for the substrate 120 for composing the ink jet printer head 101, shown in FIG. 8, is the same as the passage member 110, ceramics, glass, silicon or the like, and this substrate 120 and passage member 110 are bonded by using resin or low melting glass, or by heat. The electrode 122 formed on the substrate 120 is composed of metals such as W, Mo, Ag, Ag—Pd, Pd, Au, Ni, Cr, or two or more thereof may be combined. In the embodiment, the heating element 121 is provided at the substrate 120 side, but the heating element 121 may be also provided at the passage member 110 side. Or a plurality of passage members 110 may be laminated.

In one or more embodiments of the invention, having the heating element 121 in the passage 113, an example of applying in the ink jet printer head 101 of the system for generating bubbles by heat is disclosed, but the passage member of the invention may be also applied in the passage of ink in the piezoelectric type ink jet printer head, in the passage of ink in the compound type ink jet printer head of a foam generating type and piezoelectric type, and in the passage in other methods. The passage member of the invention is not limited to the ink jet printer head, but may be used in various applications of vacuum suction members of a small pump or an air pump, for example.

Embodiment 3

The passage member 110 of the invention shown in FIG. 8 was experimentally fabricated.

The ceramic powder for forming the partition wall 112 mainly comprises alumina ($Al_2O_3$), zirconia ($ZrO_2$), silicon nitride ($Si_3N_4$), and aluminum nitride (AlN) with mean particle size of 0.2 to 5 microns, and known sintering aids were added as required. In 100 parts by weight of these ceramic powders, the binder compositions shown in Table 4 were added, and ceramic forming compositions were prepared as mixture 112'. The kinds of the binder compositions shown in Table 4 are as shown in Table 5.

TABLE 4

| | | Binder composition | | | | | | |
|---|---|---|---|---|---|---|---|---|
| | Ceramic | Solvent | | Organic additive | | Other additive | | |
| No. | powder principal ingredient | Kind | Added parts by weight | Kind | Added parts by weight | Kind | Added parts by weight | Remarks |
| 1 | ① | ① | 10 | ② | 15 | Dispersant | 2 | Ester phosphate |
| 2 | ① | ② | 10 | ① | 15 | — | — | |
| 3 | ① | ② | 10 | ② | 15 | Dispersant | 2 | Ester phosphate |
| 4 | ① | ② | 10 | ② | 20 | Dispersant | 2 | Ester phosphate |
| 5 | ② | ② | 10 | ② | 15 | Dispersant | 2 | Dodecyl- |
| 6 | ③ | ② | 15 | ② | 15 | — | — | polyethylene glycol |
| 7 | ④ | ② | 10 | ② | 15 | Dispersant | 2 | Dodecyl-polyethylene glycol |

TABLE 5

| | Symbol | Substance name |
|---|---|---|
| Ceramic powder principal ingredient | ① | Alumina |
| | ② | Zirconia |
| | ③ | Silicon nitride |
| | ④ | Aluminum nitride |
| Solvent | ① | Diethyl phthalate |
| | ② | Octanol |
| Organic additive | ① | Epoxy resin |
| | ② | Unsaturated polyester |

After vacuum defoaming of the thus obtained mixture 112', it was injected to fill up the recess 119*a* of the molding die 119 made of silicon resin as shown in FIG. 10(*a*). Then, on the surface of the mixture 112' filling up the molding die 119. a flat plate 111 of the same ceramic sinter as the mixture 112' was applied; then this flat plate 111 was put in a heating oven, together with the molding die 119, while pressurizing at 100 g/cm$^2$, and heated and cured by holding for 45 minutes at a temperature of 100° C.

After completion of curing, as shown in FIG. 10(*b*), the partition wall 112 contacting with the flat plate 111 was parted from the molding die 119. This molding was dried for 5 hours at 120° C., held in a nitrogen atmosphere for 3 hours at 250° C., and heated to 500° C. for 12 hours remove binder. Afterwards, the piece mainly composed of alumina was held in the atmosphere for 2 hours at 1600° C.; the piece mainly composed of zirconia, in the atmosphere for 2 hours at 1450° C.; the piece mainly composed of silicon nitride, in nitrogen atmosphere for 10 hours at 1650° C.; and the piece mainly composed of aluminum nitride, in nitrogen atmosphere for 3 hours at 1800° C. Then the passage member 110 of the invention shown in FIG. 8 was obtained by baking and integrating.

The width of the partition wall 112 of the passage member 110 was 50 microns, and the width of the passage 113 was 100 microns. The substrate 120 was formed by using the same material as the passage member 110. The heating element 121 was placed on the substrate 120, and it was bonded to the passage member 110 by glass, thereby fabricating an ink jet printer head 101. This ink jet printer head 101 was mounted on an actual printer and tested, and it was confirmed to be usable satisfactorily.

Embodiment 4

In this embodiment of the invention, using the material of No. 3 in Table 4, the molding die 119 differing in surface roughness was used, and the passage members 119 differing in surface roughness were prepared. As comparative examples, in the same material and dimensions, passage members were prepared by a sand-blasting method and a screen-printing method. Using thus obtained passage members 110, ink jet printer heads 101 were manufactured as mentioned above, and tested in actual printers. The ink discharge ejection force (ink flying distance), uniformity of ink volume, and response were evaluated.

The results are summarized in Table 6, in which the characteristics are known to be very high when the surface roughness ($R_{max}$) is 0.8 micron or less in the passage members of the invention.

ber of high density and high precision can be obtained in a simple process.

Also according to the invention, by manufacturing a passage member from the process of applying a mixture of powder of ceramics, glass, silicon or the like and a binder composed of solvent and organic additive into a molding die having a recess for partition, and bonding and integrating this mixture to a flat plate made of ceramics, glass, silicon or the like, the shape of the molding die is directly transferred onto the flat plate; therefore, by preparing the molding die at high density and high precision, the partition wall can be easily formed at high density and high precision. Therefore, according to the invention, the passage member of high density and high precision can be simply manufactured, and hence the passage member may be preferably used in an application of an ink jet printer head or the like.

Figure 11:
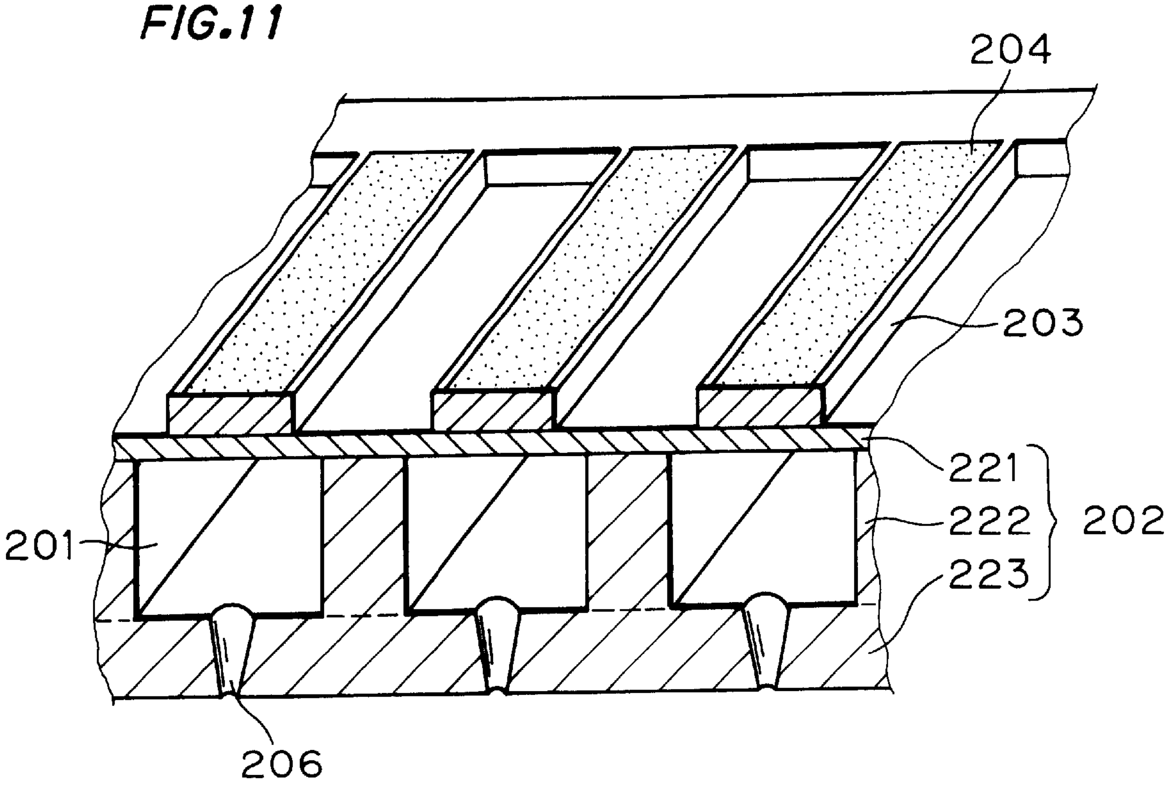
FIG. 11 is a cross-sectional view showing an ink jet printer head of the invention.
Figure 12:
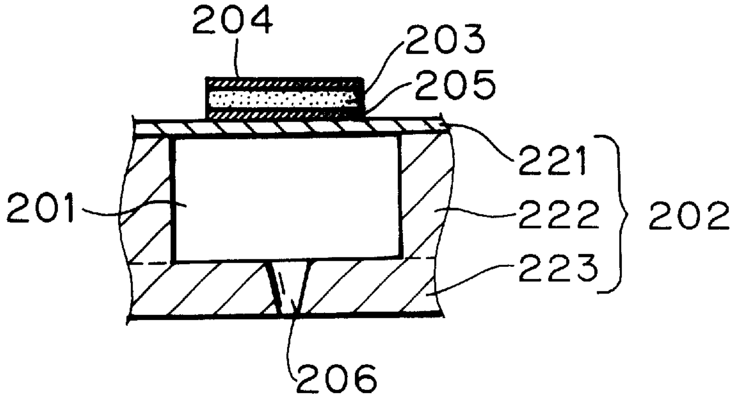
FIG. 12 is a sectional view showing an ink jet printer head.

Referring now to the drawings, an embodiment of the invention is described below. An ink jet printer head of the invention is composed, as shown in FIG. 11, by bonding a piezoelectric element 203 to a head substrate 202 having plural ink chambers 201 and an ejection port 206. The head substrate 202 is composed by mutually bonding a plate 223 forming the ejection port 206, a plate 222 forming the plural ink chambers 201 and a diaphragm 221; the piezoelectric element 203 is directly bonded to the outside of the diaphragm 221 corresponding to each ink chamber 201, and a driving electrode 204 is formed thereon.

Herein, since the diaphragm 221 is formed of a conductive inorganic material, this diaphragm 221 may be used also as a lower electrode. That is, by applying a constant voltage to the diaphragm 221, and applying a driving voltage to the driving electrode 204 on each piezoelectric element 203, the piezoelectric element 203 is deformed to deflect the diaphragm 221, and the pressure in the ink chambers 201 is raised, thereby ejecting the ink from the ejection port 206.

At this time, since the piezoelectric element 203 is directly bonded to the diaphragm 221, the deformation of the piezoelectric element 203 may be favorably transmitted to the diaphragm 221. It is a feature of the invention that the conductive inorganic material is used as the diaphragm 221, and this conductive inorganic material should be a material

TABLE 6

| | No. | Manufacturing method | Surface roughness ($R_{max}$) | Ejection force | Uniformity | Response |
|---|---|---|---|---|---|---|
| Invention | 1 | Transfer by molding die | 0.1 micron | ø | ø | ø |
| | 2 | Transfer by molding die | 0.3 micron | ø | ø | |
| | 3 | Transfer by molding die | 0.8 micron | | | |
| | 4 | Transfer by molding the | 1.0 micron | ♠ | ♠ | ♠ |
| | 5 | Transfer by molding die | 1.5 micron | ♠ | x | x |
| Comparison | 6 | Sand blasting | 0.8 micron or more | | | ♠ |
| | 7 | Screen printing | 1.0 micron or more | | ♠ | ♠ |

Evaluation: ø: Excellent, : Good, ♠: Unstable, x: Poor

The material for the flat plate 111 and partition wall 112 is not limited to the ceramics mentioned above, but same effects were obtained by using other ceramics, various types of glass or silicon. As mentioned above, according to the invention, by bonding and integrating the partition wall made by forming a powder of ceramics, glass, silicon or the like on one side of a flat plate made of ceramics, glass, silicon or the like by a molding die having a recess, and forming a passage between partition walls, a passage member of which volume specific resistance is $10^{-1}$ Ωθcm or less. In a material of which volume specific resistance exceeds $10^{-1}$ Ωθcm, heat is generated when a voltage is applied, and the ink ejection performance is not stabilized.

As the conductive inorganic material for composing the diaphragm 221, conductive ceramics, or ceramics, glass or thermet-containing conductive agent, may be used. Conductive ceramics are ceramics having their own conductivity, and, for example, ceramics having perovskite crystal structure explained in the formula (LaA) (B) $O_3$, where A is an element of periodic table group 2*a,* such as Ma, Ca, Sr, Ba; and B includes one or more element selected from the group consisting of elements such as Mn, Co, Ni, and elements of periodic table groups 3*a,* 4*a* such as La, Ce, Zr, Y. Such ceramics having perovskite crystal structure are obtained by forming and baking the material powder in the above composition, and they are conductive ceramics having the volume specific resistance of, for example, $10^{-1}$ Ωθcm or less. Specifically, using ceramics such as La—Sr—$MnO_3$, La—Ca—$MnO_3$, or La—Ca—$CrO_3$, for example, ceramics expressed as $La_{o.2}$ $Ca_{o.8}$ $MnO_3$ may be used.

Ceramics or glass-containing conductive agent is intrinsically insulating ceramics or glass, being provided with conductivity by containing a conductive agent. For example, being mainly composed of $ZrO_2$, a material containing at least one metal oxide out of NiO, $MnO_2$, $Fe_2O_3$, $Cr_2O_3$, and CoO as conductive agent may be used. More specifically, ceramics comprising 30 to 60 wt. % of $ZrO_2$ containing stabilizing agent, and 70 to 40 wt. % of conductive agent such as NiO may be used after baking in oxidizing atmosphere. Besides, mainly composed of $Al_2O_3$, SiC, $Si_3N_x$, etc., ceramics containing a specific conductive agent and adjusted to the specified volume specific resistance may be used. Moreover, made of amorphous or crystalline glass, a material containing 3 to 50 wt. % of conductive agent such as $RuO_2$ may be used.

The thermet is a compound sinter of a ceramic component and metal component, and, for example, a compound sinter containing TiC, TiN or the like as ceramic component, and containing Fe, Ni, Co or the like as metal component may be used. Incidentally, when a material other than amorphous glass is used as the conductive inorganic material, its mean crystal particle size is preferred to be defined in a range of 0.8 to 10 microns. This is because it is hard to bake until dense at less than 0.8 micron, and degranulation and other defects are likely to occur when exceeding 10 microns.

As for the plates 222 and 223 for composing the head substrate 202, various materials can be used. For example, when formed of the same material as the diaphragm 221, there is no difference in thermal expansion, and breakage during use can be prevented. On the other hand, when the plates 222 and 223 are made of insulating ceramics or glass, insulation measures are necessary when placing metal or other conductive parts around the head.

The material for the piezoelectric element 203 is mainly composed of, for example, lead titanate-zirconate (PZT series), lead magnesium niobate (PMN series), lead nickel niobate (PNN series), lead manganese niobate, and lead titanate, or their compound material. Moreover, the driving electrode 204 is formed of at least one of, for example, gold, silver, palladium, platinum, and nickel. In the ink jet printer head of the invention, in order to obtain a favorable response of the drive unit including the diaphragm 221, it is required to design to assure the rigidity of the drive unit by the structure of driving electrode 204 and piezoelectric element 203, but when the driving electrode 204 or the piezoelectric element 203 are extremely made thick, the deformation of the piezoelectric element 203 can be hardly transformed into the deflection of the diaphragm 221.

Under such restrictions, in order to produce a sufficient displacement in the diaphragm 221 while maintaining the rigidity of the drive unit, preferably, the Young's modulus of the conductive inorganic material for forming the diaphragm 221 should be 50 to 300 GPa, and its thickness, 5 to 50 microns. Also, the thickness of the piezoelectric element 203 is preferred to be 100 microns or less, and the thickness of the driving electrode 204 at the inside of the curvature when driving to be 5 microns or less. When deforming the diaphragm 221, incidentally, the diaphragm 221 may be broken due to stress. To realize a free structural design of the diaphragm 221 while preventing decline of reliability due to breakage of the head, the bending strength of the conductive inorganic material for composing the diaphragm 221 is preferred to be 80 MPa or more.

A manufacturing method of the ink jet printer head of the invention is described below. First, a same material as the diaphragm 221 mentioned above, or a green sheet made of insulating ceramics or glass is formed by doctor blade method or dipping method, portions corresponding to ejection port 206, ink chambers 201 and ink passages are blanked by using a die, sheet moldings of plates 222, 223 are fabricated, and green sheets are laminated as the diaphragm 221 from the conductive inorganic material, and the entire structure is compressed and baked, and the head substrate 202 is formed.

Consequently, on the diaphragm 221 corresponding to each ink chamber 201, a piezoelectric material is formed as piezoelectric element 203 by thick film forming method, and is baked, and a conducive paste for driving upper electrode 204 is formed thereon by printing or other thick film forming method, or evaporating, sputtering or other thin film forming method. As the forming method of piezoelectric element 203, green sheets may be laminated, or a thin film may be formed by CVD or other method. As the shape of the piezoelectric element 203, each end is coupled in FIG. 11, but each may be also formed independently. To form the piezoelectric element 203 into the shape shown in FIG. 1, the procedure includes a method of applying on the entire surface, masking and removing unnecessary parts by sand blasting, or a reverse method of masking specific positions on the diaphragm 221, and applying the piezoelectric element 203 in the other positions.

As the material for the diaphragm 221 or the like, when a material containing conductive non-oxide such as thermet is used, same as mentioned above, the head substrate 202 is fabricated, and is sintered in a reducing atmosphere. Later, the piezoelectric element 203 is formed on the diaphragm 221, and the head substrate 202 made of non-oxide is baked in a low temperature region so as not to be oxidized, and the driving electrode 204 baked at low temperature is formed thereon by screen printing or other thick film forming method, or evaporating, sputtering or other thin film forming method.

To fabricate the head substrate 202, meanwhile, aside from the method mentioned above, a casting method using a resin pattern may be also employed. In this way, in the ink jet printer head of the invention, the piezoelectric element 203 is directly disposed on the diaphragm 221 without forming lower electrode, so that the manufacturing process may be simplified. The ink jet printer head of the invention is not limited to the structure shown in FIG. 11, and the shape and position of the ink chambers 201 and ejection port 206 may be freely changed.

Embodiment 5

By trial production of the ink jet printer head shown in FIG. 11, a driving test was conducted by varying the volume specific resistance of the material for composing the diaphragm 221. The diaphragm 221 was formed of conductive ceramics composed of perovskite oxide having various volume specific resistance values as designated below, with the length of the portion corresponding to the ink chamber 201 of 1 mm in the longitudinal direction and 0.2 mm in the width direction, and the thickness of 15 microns. The thickness of the piezoelectric element 203 was 30 microns, the number of drive units was five, the applied voltage was 70 V, and the wave was rectangular with 1 kHz.

In the above conditions, by passing a specific current continuously to the diaphragm 221 side to establish a specific potential, a voltage was applied to the driving electrode 204 side, and the piezoelectric element 203 was driven. By driving continuously for 5 minutes, if the temperature rise is over 10° C., the ink ejection performance is not stable, and hence it is not preferred as a printer head. If the fluctuation of displacement among drive units is over 20%, it is evaluated as defective driving performance. The results are as follows.

| Diaphragm volume specific resistance (Ωθcm) | Temperature rise (° C.) | Driving performance |
|---|---|---|
| 0.5 × $10^{-1}$ | 3 | Excellent |
| 0.7 × $10^{-1}$ | 5 | Excellent |
| 1.0 × $10^{-1}$ | 7 | Excellent |
| 1.2 × $10^{-1}$ | 10 | Poor |

In these results, a large fluctuation of displacement among drive units was noted when the volume specific resistance of the diaphragm 221 was larger than 1.0×$10^{-1}$ Ωθcm because a potential difference occurs among units when passing a current into the diaphragm 221. Besides, when the temperature rise of the diaphragm 221 is extreme, the ink viscosity is changed by heat, and the ejection characteristic varies, and the printing performance of the printer is no longer stable. By continuous driving for 5 minutes, the temperature rise of the diaphragm was 10° C. or less in all samples, and considering stability of the printer in longer continuous use and driving performance of the head, the volume specific resistance of the diaphragm 221 is preferred to be in a range of 1.0×$10^{-1}$ Ωθcm or less.

Embodiment 6

Same as above, further adding $RuO_2$ to the glass as the material for the diaphragm 221, the content $RuO_2$ and qualification as the material for diaphragm 221 were investigated. As a result, when the content of $RuO_2$ is in a range of 3 to 50 wt. %, the volume specific resistance is in a range of $10^{-1}$ to $10^{-2}$ Ωθcm, and it is found to be excellent as shown below.

| $RuO_2$ content (wt. %) | Qualification as diaphragm |
|---|---|
| Less than 3% | Resistance is high, hence improper |
| 3 to 50% | Appropriate |
| 50% or over | Material strength is low, hence improper |

Embodiment 7

Same as above, as the material for the diaphragm 221, a material mainly composed of $ZrO_2$ as conductive agent was used, and the content of NiO was varied, and the volume specific resistance was measured. The results are as follows. When the NiO content was 40 wt. % or morehe volume specific resistance was $10^{-1}$ Ωθcm or less. On the other hand, when the NiO content exceeded 70 wt. %, the material strength dropped, and hence the content of NiO was preferred to be in a range of 40 to 70 wt. %.

| NiO content (wt. %) | $ZrO_2$ (Wt. %) | Volume specific resistance (Ωθcm) |
|---|---|---|
| 70 | 30 | $10^{-5}$ |
| 60 | 40 | $10^{-5}$ |
| 50 | 50 | $10^{-4}$ |
| 40 | 60 | $10^{-3}$ |
| 30 | 70 | $10^{-1}$ |
| 20 | 80 | $10^{-6}$ |

Embodiment 8

The thickness of the diaphragm 221 and piezoelectric element 203 was changed, and the displacement of the diaphragm 221 and the maximum generated stress were determined by the finite elemnet method. The following specimens were prepared.

Specimen A: Diaphragm 221 with longitudinal direction dimension of 1 mm, width direction of 0.2 mm, thickness of 1 to 20 microns, piezoelectric element 203 with thickness of 30 microns, applied voltage of 70 V.

Specimen 8: Diaphragm 221 with longitudinal direction dimension of 3 mm, width direction of 0.5 mm, thickness of 15 to 35 microns, piezoelectric element 203 with thickness of 50 microns, applied voltage of 100 V.

Specimen C: Diaphragm 221 with longitudinal direction dimension of 5 mm, width direction of 0.7 mm, thickness of 30 to 70 microns, piezoelectric element 203 with thickness of 100 microns, applied voltage of 200 V.

In all specimens, the Young's modulus of the material for the diaphragm 221 was 150 GPa, and driving electrode 204 was not used. The results are as follows.

Specimen A (minimum allowable diaphragm displacement 0.1 micron)

| Diaphragm thickness ($\mu$m) | Diaphragm displacement ($\mu$m) | Maximum stress (MPa) | |
|---|---|---|---|
| 1 | 0.48 | 153 | Excessive stress |
| 5 | 0.24 | 97 | Appropriate |
| 10 | 0.17 | 71 | Appropriate |
| 15 | 0.13 | 54 | Appropriate |
| 20 | 0.09 | 49 | Insufficient displacement |

Specimen B (minimum allowable diaphragm displacement 0.02 micron)

| Diaphragm thickness ($\mu$m) | Diaphragm displacement ($\mu$m) | Maximum stress (MPa) | |
|---|---|---|---|
| 15 | 0.064 | 97 | Appropriate |
| 20 | 0.048 | 81 | Appropriate |
| 25 | 0.032 | 72 | Appropriate |
| 30 | 0.022 | 65 | Appropriate |
| 35 | 0.017 | 51 | Insufficient displacement |

Specimen C (minimum allowable diaphragm displacement 0.01 micron)

| Diaphragm thickness (μm) | Diaphragm displacement (μm) | Maximum stress (MPa) | |
|---|---|---|---|
| 30 | 0.034 | 84 | Appropriate |
| 40 | 0.021 | 80 | Appropriate |
| 50 | 0.016 | 77 | Appropriate |
| 60 | 0.011 | 75 | Appropriate |
| 70 | 0.009 | 74 | Insufficient displacement |

In specimens A to C, as the diaphragm 221 is thinner, the displacement is larger, but the maximum stress occurring in the diaphragm 221 becomes higher, and the diaphragm 221 is easily broken. Accordingly, in order to prevent damage of the diaphragm 221 while maintaining a specific displacement, it is necessary to set the thickness properly by defining the bending strenght of the material. Herein, the bending strength of the material for the diaphragm 221 was set at 80 MPa or more, and further considering the reliability of the diaphragm 221, an appropriate design of the diaphragm is defined so that the generated stress be 120 MPa or law.

In these specimens A to C, as the area of the diaphragm 221 is wider, the displacement of the diaphragm 21 required to eject a specified amount of ink becomes smaller in inverse proportion, and hence the thickness of the diaphragm 221 was determined in gradual steps depending on the area. In order to prevent damage while maintaining displacement in each shape, the thickness of the diaphragm 221 is desired to be set in a range of 5 to 50 microns.

Embodiment 9

Same as in embodiment 4, the Young's modulus of the diaphragm 221 was compared. The following specimens were prepared.

Specimen D: Diaphragm 221 with longitudinal direction dimension of 1 mm, width direction of 0.2 mm, thickness of 15 microns, piezoelectric element 203 with thickness of 30 microns, applied voltage of 70 V.

Specimen E: Diaphragm 221 with longitudinal direction dimension of 3 mm, width direction of 0.5 mm, thickness of 25 microns, piezoelectric element 203 with thickness of 50 microns, applied voltage of 100 V.

Specimen F: Diaphragm 221 with longitudinal direction dimension of 5 mm, width direction of 0.7 mm, thickness of 50 microns, piezoelectric element 203 with thickness of 100 microns, applied voltage of 200 V.

The Young's modulus of the material for the diaphragm 221 was 40, 80, 150, 200, and 250 GPa, and driving electrode 204 was not used. The results are as follows.

Specimen D (minimum allowable diaphragm displacement 0.1 micron, natural frequency 250 kHz or more)

| Young's modulus (GPa) | Diaphragm displacement (μm) | Max. stress (MPa) | Natural frequency (kHz) | |
|---|---|---|---|---|
| 40 | 0.16 | 44 | 243 | Improper response |
| 80 | 0.15 | 48 | 330 | Appropriate |
| 100 | 0.14 | 50 | 360 | Appropriate |
| 150 | 0.13 | 54 | 421 | Appropriate |
| 200 | 0.12 | 56 | 472 | Appropriate |
| 250 | 0.11 | 57 | 499 | Appropriate |
| 300 | 0.10 | 58 | 511 | Appropriate |
| 320 | 0.09 | 59 | 514 | Insufficient displacement |

Specimen E (minimum allowable diaphragm displacement 0.02 micron, natural frequency 100 kHz or more)

| Young's modulus (GPa) | Diaphragm displacement (μm) | Max. stress (MPa) | Natural frequency (kHz) | |
|---|---|---|---|---|
| 40 | 0.046 | 56 | 85 | Improper response |
| 80 | 0.041 | 64 | 59 | Appropriate |
| 100 | 0.038 | 67 | 191 | Appropriate |
| 150 | 0.032 | 72 | 251 | Appropriate |
| 200 | 0.027 | 75 | 308 | Appropriate |
| 250 | 0.023 | 77 | 343 | Appropriate |
| 300 | 0.020 | 79 | 371 | Appropriate |
| 320 | 0.018 | 79 | 394 | Insufficient displacement |

Specimen F (minimum allowable diaphragm displacement 0.01 micron, natural frequency 100 kHz or more)

| Young's modulus (GPa) | Diaphragm displacement (μm) | Max. stress (MPa) | Natural frequency (kHz) | |
|---|---|---|---|---|
| 40 | 0.026 | 66 | 42 | Improper response |
| 80 | 0.022 | 71 | 81 | Improper response |
| 100 | 0.020 | 73 | 103 | Appropriate |
| 150 | 0.016 | 77 | 145 | Appropriate |
| 200 | 0.014 | 80 | 186 | Appropriate |
| 250 | 0.012 | 83 | 231 | Appropriate |
| 300 | 0.010 | 85 | 260 | Appropriate |
| 320 | 0.009 | 86 | 271 | Insufficient displacement |

As the natural frequency of the diaphragm 221 becomes lower, the response drops, and the number of times of ejection of ink per unit time decreases, and hence the printing speed declines. Herein, by varying the Young's modulus of the material for the diaphragm 221, the natural frequency of the diaphragm 221 was evaluated as the index of response.

By increasing the Young's modulus of the diaphragm 221, the natural frequency elevates, but the diaphragm 221 is less likely to be deformed, and a required displacement may not be obtained. In these results, it is evaluated appropriate when both response and displacement are established in each shape of diaphragm 221; but considering a possible correction range by design change, an appropriate range of Young's modulus of the diaphragm 221 is 50 to 300 GPa, preferably 50 to 220 Pa.

Embodiment 10

Same as the embodiment above, the thickness of the driving electrode 204 was compared. The following specimens were prepared.

Specimen G: Diaphragm 221 with longitudinal direction dimension of 1 mm, width direction of 0.2 mm. thickness of 15 microns, piezoelectric element 203 with thickness of 30 microns, applied voltage of 70 V.

Specimen H: Diaphragm 221 with longitudinal direction dimension of 3 mm, width direction of 0.5 mm, thickness of 25 microns, piezoelectric element 203 with thickness of 50 microns, applied voltage of 100 V.

Specimen I: Diaphragm 221 with longitudinal direction dimension of 5 mm, width direction of 0.7 mm, thickness of 50 microns, piezoelectric element 203 with thickness of 100 microns, applied voltage of 200 V.

The Young's modulus of the material for the diaphragm 221 was 240 GPa, the Young's modulus of the driving electrode 204 was 100 GPa, and its thickness was set at 0, 1, 2, 3, 4, 5, 6 microns. The results are as follows.

| Thickness of driving electrode (μm) | Displacement of diaphragm of specimen G (μm) | Displacement of diaphragm of specimen H (μm) | Displacement of diaphragm of specimen I (μm) |
|---|---|---|---|
| 0 | 0.13 | 0.032 | 0.016 |
| 1 | 0.12 | 0.031 | 0.016 |
| 2 | 0.11 | 0.029 | 0.015 |
| 3 | 0.08 (improper) | 0.025 | 0.014 |
| 4 | | 0.02 | 0.013 |
| 5 | | 0.012 (improper) | 0.011 |
| 6 | | | 0.007 (improper) |

In the results, (improper) means insufficient displacement. Thus, by the rigidity of the driving electrode 204, flexural displacement of the diaphragm 221 by the piezoelectric element 203 is suppresed, and it has effects on the ink ejection performance in the head; it is confirmed that the driving characteristic is superior when the driving electrode 204 is thinner. In particular, when the diaphragm 221 itself is thin, this effect is remarkable. Besides, as the total thickness of the diaphragm 221 including the piezoelectric element 203 and others becomes larger, the occupation ratio of thickness of the driving electrode 204 in it becomes smaller, and the effect on the displacement of the diaphragm 221 becomes smaller.

As known from these results, in order to keep an appropriate displacement of each diaphragm 221, the thickness of the driving electrode 204 is preferred to be 5 microns or less.

Embodiment 11

Same the embodiment above, the thickness of the piezoelectric element 203 was compared. The following specimens were prepared.

Specimen J: Diaphragm 221 with longitudinal direction dimension of 1 mm, width direction of 0.2 mm thickness of 1 to 20 microns, piezoelectric element 203 with thickness of 20, 30, 40 microns, applied voltage of 70 V.

Specimen K: Diaphragm 221 with longitudinal direction dimension of 3 mm, width direction of 0.5 mm, thickness of 15 to 35 microns, piezoelectric element 203 with thickness of 40, 50, 60 microns, applied voltage of 100 V.

Specimen L: Diaphragm 221 with longitudinal direction dimension of 5 mm, width direction of 0.7 mm, thickness of 30 to 70 microns, piezoelectric element 203 with thickness of 80, 100, 120 microns, applied voltage of 200 V.

The results are as follows.

Specimen J (minimum allowable diaphragm displacement 0.1 micron)

| Piezoelectric element thickness (μm) | Max. displacement (μm) | Max. stress (MPa) | |
|---|---|---|---|
| 3 | 0.36 | 138 | Excessive stress |
| 5 | 0.35 | 116 | Appropriate |
| 5 | 0.23 | 82 | Appropriate |
| 24 | 0.16 | 63 | Appropriate |
| 30 | 0.13 | 54 | Appropriate |
| 36 | 0.07 | 50 | Insufficient displacement |

Specimen K (minimum allowable diaphragm displacement 0.02 micron)

| Piezoelectric element thickness (μm) | Max. displacement (μm) | Max. stress (MPa) | |
|---|---|---|---|
| 30 | 0.061 | 107 | Appropriate |
| 40 | 0.043 | 83 | Appropriate |
| 50 | 0.032 | 72 | Appropriate |
| 60 | 0.024 | 66 | Appropriate |
| 70 | 0.014 | 62 | Insufficient displacement |

Specimen L (minimum allowable diaphragm displacement 0.01 micron)

| Piezoelectric element thickness (μm) | Max. displacement (μm) | Max. stress (MPa) | |
|---|---|---|---|
| 70 | 0.033 | 156 | Excessive stress |
| 80 | 0.028 | 118 | Appropriate |
| 90 | 0.019 | 96 | Appropriate |
| 100 | 0.016 | 77 | Appropriate |
| 110 | 0.008 | 71 | Insufficient displacement |

As shown in the results, when the thickness of the piezoelectric element 203 is increased, the displacement decreases. This is because, as the thickness of the piezoelectric element 203 increases, it acts as the restraint to the displacement of the diaphragm 221, and the electric field acting on the piezoelectric element 203 (voltage/distance between electrode (that is, thickness of piezoelectric element 203)) becomes smaller, so that the displacement of the piezoelectric element 203 becomes smaller. Therefore, with the thickness of the piezoelectric element 203 increased, in order to produce a necessary displacement in the diaphragm 221, it is necessary to increase the applied voltage, which leads to an increase of power consumption and heat generation in the driving circuit, and it is not preferred in design. Considering such effects, herein, it is preferred to define the thickness of the piezoelectric element 203 within 100 microns.

Thus, according to the invention, an ink jet printer head comprising plural ink chambers, an ejection port communicating with the ink chambers, and a diaphragm for applying pressure to the ink chambers is described. The diaphragm is composed of conductive inorganic material, where a piezoelectric element is bonded to the diaphragm, and a driving electrode is formed on the piezoelectric element. Therefore, a lower electrode is not needed, and the displacement of the piezoelectric element is favorably transmitted to the diaphragm. As a result, the head excellent in driving characteristics can be manufactured easily.

Thus, one or more printer head members according to one or more embodiments of the invention are described. While only a number of embodiments consistent with the present invention have been described, those skilled in the art will understand that various changes and modifications may be made to these embodiments, and equivalents may be substituted for elements in these embodiments, without departing from the true scope of the invention.

In addition, modifications may be made to adapt a particular element, technique or implementation to the teachings of the present invention without departing from the central scope of the invention. Therefore, this invention should not be limited to the particular embodiments and methods disclosed in this application, but should include all embodiments that fall within the scope of the appended claims.

What is claimed is:

1. A method of manufacturing a printer head member having a body and ultrafine grooves, said method comprising:

applying a mixture of a binder and powder of a nonmetallic material, selected from a group essentially consisting of ceramics, glass, and silicon, to a molding die, said molding die having at least one fine groove on its surface to receive the mixture;

filling said at least one fine groove with the mixture to form at least one partition wall, wherein a portion of the mixture is exposed out of said at least one fine groove; and bonding and integrating said exposed portion of the mixture to a flat plate composed of a nonmetallic material selected from a group essentially consisting of ceramic, glass, and silicon.

2. The method of claim 1, wherein the step of bonding and integrating said exposed portion of the mixture to the flat plate comprises the steps of solidifying the mixture in the molding die and parting the molding die away from the flat plate to thereby leave the solidified mixture on the flat plate.

3. The method of claim 2, wherein said binder is further comprised of at least one organic additive.

4. The method of claim 1 further comprising:

removing said at least one partition wall molded into said at least one fine groove from the molding die by displacing the flat plate away from the molding die.

5. The method of claim 4, wherein the step of bonding and integrating said at least one partition wall to the flat plate includes sintering the flat plate and said at least one partition wall.

6. A method of manufacturing a passage member for guiding the flow of ink, said member having a body and ultrafine grooves, said method comprising:

applying a mixture of a binder and powder of a nonmetallic material, selected from a group essentially consisting of ceramics, glass, and silicon, to a molding die, said molding die having a plurality of fine grooves to receive the mixture, at least one groove conforming to the shape of a partition wall;

filling said plurality of fine grooves with the mixture to form a plurality of partition walls arrayed in one direction, said plurality of partition walls forming at least one passage for guiding the flow of ink, wherein a portion of the mixture is exposed out of said plurality of fine grooves; and bonding and integrating said exposed portion of the mixture to a flat plate composed of a nonmetallic material selected from a group essentially consisting of ceramic, glass, and silicon.

7. The method of claim 6, wherein the step of bonding and integrating said exposed portion of the mixture to the flat plate comprises the steps of solidifying the mixture in the molding die and parting the molding die away from the flat plate to thereby leave the solidified mixture on the flat plate.

8. The method of claim 7, wherein said binder is further comprised of at least one organic additive.

9. The method of claim 6 further comprising:

removing said plurality of partition walls molded into said plurality of fine grooves from the molding die by displacing the flat plate away from the molding die.

10. The method of claim 9, wherein the step of bonding and integrating said exposed portion of the mixture to the flat plate includes sintering the flat plate and the mixture.

* * * * *